United States Patent [19]
Yokoi

[11] Patent Number: 5,194,812
[45] Date of Patent: Mar. 16, 1993

[54] DEVICE FOR DETERMINING DEPTH AND DIRECTION OF BURIED OBJECTS

[75] Inventor: Shin Yokoi, Osaka, Japan
[73] Assignee: Yokoi Manufacturing Co., Ltd., Osaka, Japan
[21] Appl. No.: 762,603
[22] Filed: Sep. 19, 1991
[30] Foreign Application Priority Data
  May 16, 1991 [JP] Japan .................. 3-141329
[51] Int. Cl.$^5$ .................. G01V 3/08; G01V 3/10; G01R 19/00
[52] U.S. Cl. .................. 324/326; 324/67
[58] Field of Search .............. 324/326, 327, 328, 329, 324/67

[56] References Cited
U.S. PATENT DOCUMENTS
3,991,363  11/1976  Lathrop .................. 324/67

FOREIGN PATENT DOCUMENTS
61-210935  9/1986  Japan .................. 324/67

Primary Examiner—Walter E. Snow
Attorney, Agent, or Firm—Griffin, Butler, Whisenhunt & Kurtossy

[57] ABSTRACT

Apparatus for locating buried objects such as underground pipes, cables or the like where a transmitter (1) generates an alternating current signal which is fed into the object to produce an alternating field emanating from the object, and a receiver (2) locates this radiation to identify the position of the object. A secondary transmitter (T) transmits a reference signal of the same frequency and phase as the original signal, and a signal processor in a receiver (2a) combines the two signals to eliminate the effects of noise.

7 Claims, 6 Drawing Sheets

DEVICE FOR DETERMINING DEPTH AND DIRECTION OF BURIED OBJECTS

FIELD OF THE INVENTION

The present invention relates to apparatus for locating objects buried underground such as pipes, cables and the like; more particularly, the invention relates to apparatus that enables a deeply buried object to be located accurately by the detection of an induced current emanating from the object. In this respect the main object of the invention is to provide such a device which can operate with small detection currents while minimizing the effects of extraneous noise.

BACKGROUND AND OBJECTS OF THE INVENTION

Figure 9:
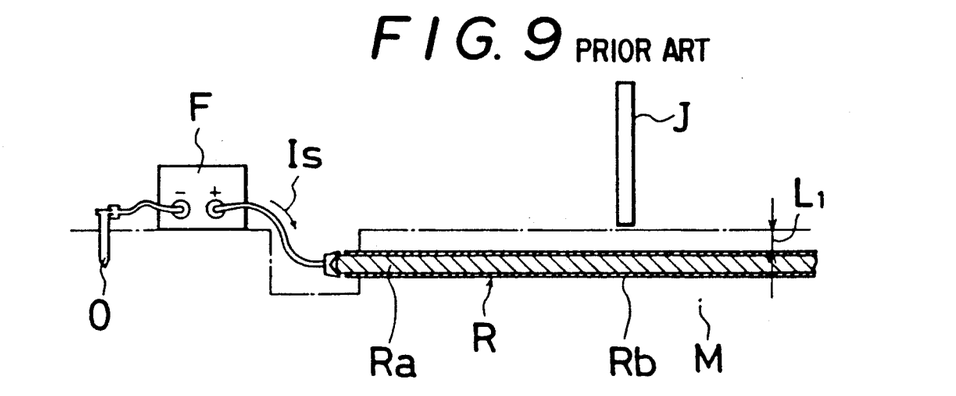
FIG. 9 is a general explanatory drawing for location of a power cable by use of a prior art buried object locating device.
Figure 10:
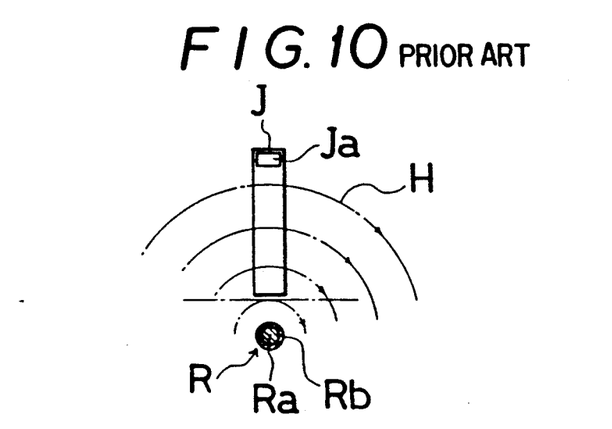
FIG. 10 is an explanatory drawing of the generation status of the alternating field H in FIG. 9; and, FIG. 11 is an explanatory drawing for location of a non-conductive pipe by the use of a prior art buried object detecting device.
Figure 11:
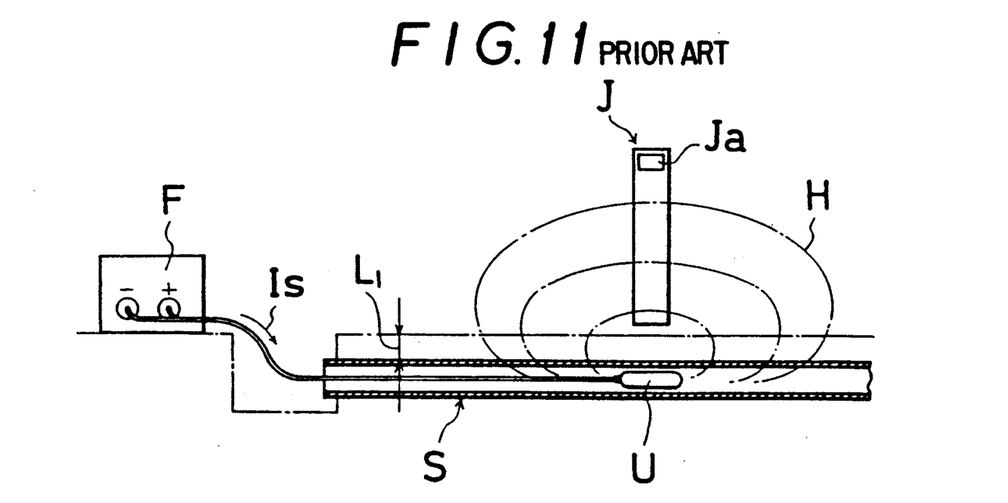

FIGS. 9-11 of the accompanying drawings illustrate a prior art device of the solenoid induction type. The device generally comprises a transmitter F and receiver J. In order to locate a buried power cable R or the like, initially it is necessary to connect the transmitter F and conductor Ra of the cable R as shown in FIG. 9, and then to supply a location current Is having a frequency between 10 Hz-500 kHz to the conductor Ra from the transmitter F.

The location current Is flows into the ground M through the distributed capacitance formed by the conductor Rb, insulator R, and ground M, and then it returns to the transmitter F through the earth electrodes O. Flow of the location current Is into the conductor Ra forms a magnetic field H as shown in FIG. 10 around the power cable R.

A detection current is created in the receiving coil Ja of the receiver J by placing it in the magnetic field H and then interlinking the receiving coil Ja and the magnetic field H. The detection current induced in the receiving coil Ja indicates the depth L1 of the power cable R, and the direction thereof. These quantities are based on the parameters of the detection current and they are indicated to the operator.

To locate a pipe S or the like, a compact originating coil U is inserted into the pipe S as shown in FIG. 11, and a location current Is is provided to this originating coil U from a transmitter F. Flow of the location current Is into said originating coil U generates a magnetic field H around the originating coil U.

Placement of a receiver J equipped with a receiving coil Ja in said magnetic field H causes the receiving coil Ja to generate a detection current. The depth 4 of the pipe S and the direction thereof are calculated on the basis of the parameters of this detection current and they are indicated to the operator.

If there is no other noise source near the power cable R and pipe S, the conventional solenoid type induction type buried object locating device can perform accurate location of the buried object by using a comparatively small location current Is, thus resulting in excellent efficiency. However, the case where there is no noise source is very rare and in general, a noise source exists and this results in a signal produced by both the location current Is and a noise signal and it becomes difficult to make an accurate determination of the depth and horizontal location of the buried object. This is particularly so in the case where the depth L, of the power cable R or pipe S, is large or in the case where the power cable R or pipe S is shielded by some other conductive object.

One possible solution to the noise problem is to increase the magnitude of the location current Is fed from the transmitter Fa and thereby diminish the noise to signal ratio.

However, if the frequency of the location current Is becomes 10 kHz or greater, in many cases the magnitude of the location current Is may be limited by law, and it becomes impossible to increase the location current (Is) and thereby diminish the noise to signal ratio.

Accordingly, it is a primary object of the present invention to solve the aforementioned problems for the conventional solenoid induction type buried object locating device. More particularly, these problems are that if the noise to signal ratio increases by the influence of the external noise and the depth of the buried object is great, it is impossible to perform accurate location. Furthermore, if the frequency of the location current Is becomes 10 kHz or greater, in many cases the magnitude of the location current Is may be limited by law and it is impossible to increase the location current Is and diminish the noise to signal ratio. Thus, the invention provides apparatus for locating a buried object wherein the location capability of the apparatus can be greatly increased by an automatic, and in many cases virtually complete, removal of the noise content from the current detected by a receiving coil Ja of a receiver J.

SUMMARY OF THE INVENTION

Accordingly, the invention provides apparatus for locating buried objects such as underground pipe, cables or the like, which comprises a transmitter 1 arranged to transmit an alternating current signal Is which generates an alternating magnetic field emanating from the object to the located, and a receiver 2 which includes a receiving coil and is arranged to receive a detection current induced in said receiving coil by said alternating magnetic field dependent on the location of the object and a detection unit (A) for processing said detection current to indicate the location of said object characterized in that the transmitter comprises means (1b) for transmitting a reference signal (T) having the same frequency and phase as the alternating current signal generating said magnetic field, and the receiver comprises means (B) for receiving said reference signal, and a signal processor (C) which derives an output dependent on the received reference signal and the detection current.

In a preferred embodiment, the invention includes a basic configuration (see the Figures for identification of the reference numerals) equipped with the following units: A transmitter 1 for supplying a location current Is of frequency fs for forming an alternating field around a buried object; a receiver 2 for detecting the position of the buried object on the basis of the detected value of said alternating field; a detection unit A equipped with a reference signal transmitter 1b for transmitting a reference signal T having the same frequency and phase as that of the location signal Is, and a location coil 3; an analog signal processor C equipped with a multiplier for multiplying the output signal from the detection unit A with the reference signal T transmitted from said reference signal transmitter 1b, and a filter for the output from the multiplier; and a display unit E for indication of an output signal transmitted from the analog signal processor C.

In another from of the invention, the apparatus comprises the following units; a transmitter 1 for supplying a location current Is of frequency fs for forming an alternating field around a buried object, or a transmission coil 8 inserted into the buried object; a receiver 2 for detecting the position of the buried object on the basis of the detected value of said alternating field; a detection unit A equipped with a reference signal transmitter 1b for transmitting a reference signal T having the same frequency and phase as that of the location current Is, and a detection coil 3; an analog signal processor C equipped with a multiplier for multiplying the output signal from said detection unit A with the reference signal T transmitted from said reference signal transmitter 1b, and a filter for the output from the multiplier; a calculation processing unit D equipped with an A-D converter for converting the output signal from the analog signal processing unit C into a digital signal, and a microprocessor for calculating the position of the buried object by using the difference between the output signals of detection coils at a lower position $P_2$ and an upper position $P_1$; and a display unit E for displaying the calculation results.

Flow of a location current Is of the frequency fs supplied from a transmitter I into a buried electric conductor 4a (or transmitter 8 built into the buried object) generates an alternating field H around the electric conductor 4a (or oscillator 8). A reference signal T having the same frequency and phase as the location current Is is transmitted from the reference signal transmitter 1b.

Placement of the detection coil 3 of the receiver 2 in said magnetic field H causes the detection coil 3 and magnetic flux to be interlinked and induces the detection current IR in the detection coil 3.

The detection current Ir of the detection coil 3 contains a noise current IRn from the noise source in addition to the signal current IRs generated by the magnetic field of the location current Is. The detection current IR is passed through a first filter 10 after being amplified, and then the output signal Q near the frequency fs is fed to a multiplier 11.

In the multiplier 11, the output signal Q and a reference signal T from the reference signal transmitter 1b are multiplied, thus resulting in the component of the output signal Q having the same frequency and phase as that of the reference signal T is changed into a DC component. The component of the output signal having the same frequency fs of the reference signal T, but differing therefrom in phase, is removed.

The output signal V containing the DC component is fed from the multiplier 11 while the alternating current (AC) component contained in the signal V is removed by the second filter and only the DC component survives to become the output signal X.

If the detection coil 3 is one piece, the DC output X from the second filter 12 is directly fed to the display 21 comprising meters and the position of a buried object is presumed on the basis of the size of a needle movement of the display 21.

If one piece of detection coil 3 is mounted on each of a lower position $P_2$ and upper position $P_1$ (i.e. the total number of the detection coils 3 amount to two), or if a pair of detection coils 3 are mounted on each of the lower position $P_2$ and upper position $P_1$ (the total number of detection coils amount to 4), the DC output X fed from said second filter is converted into a digital signal and then it is provided as input into the microprocessor 19.

In the microprocessor 19, the signal Xa (or the signal Xa-Xa') transmitted from the lower position $P_2$ and the signal Xb (or the signal Xb-Xb') transmitted from the upper position $P_1$ are individually processed. This causes the noise contained in the DC component (that is, the DC noise component from the noise source or the AC noise component that has passed through the second filter 12), having the same frequency and phase as the reference signal (T) to disappear, and the signal Xa-Xb (or the signals Xa-Xb-Xa'-Xb') contain only a component induced by the location current Is.

In the microprocessor, the depth of the buried object is continuously calculated by using the data for the signal Xa-Xb (or the signals Xa-Xb-Xa'-Xb'), the distance $L_2$ between the points $P_1$ and $P_2$, the buried depth $L_1$, the distance $L_3$ between the ground G and point $P_2$, and it is indicated on a display. Movement of the receiver 2, and measurement of the signal Xa-Xb (or the signal Xa-Xb-Xa'-Xb') in the same way as mentioned above can calculate the horizontal direction of the buried object on the basis of the change of the measurement values.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
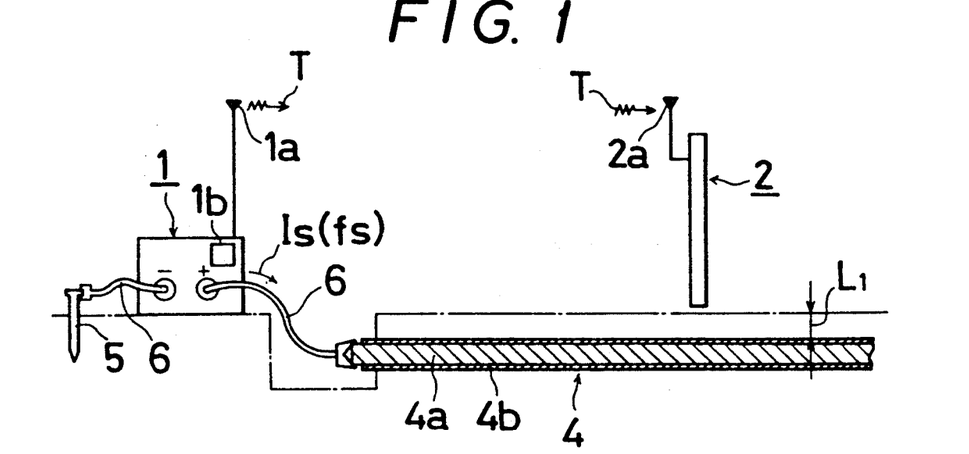
FIG. 1 is a general explanatory drawing for location of a power cable by the use of a buried object locating device of the present invention.

FIG. 1 is a general explanatory drawing of power cable location by means of a buried object locating device of the present invention. In FIG. 1, there is shown a transmitter 1, a reference signal transmission antenna 1a, a reference signal transmitter 1b, a receiver 2, a receiving antenna 2a of the reference signal 1, a detection coil 3 of the receiver, a power cable 4, a conductor 4a, an insulator 4b, a ground pole 5 and a lead wire 6. One of the apparent differences from the conventional buried object locating device is in the aspect that a transmission antenna 1a of the reference signal is mounted on the transmitter 1 and that a receiving antenna 2a of the reference signal is mounted on the receiver 2.

In operation, to locate the power cable 4, a location current of current Is of the proper frequency fs is applied to the conductor 4a from the transmitter 1 through the lead wire 6. From the transmission antenna 1a of the transmitter 1, a reference signal T having the same frequency and phase as that of the location current Is is transmitted by the reference signal transmitter 1b.

To operate the receiver 2, the detection coil 3 of the receiver 2 is interlinked with the alternating field generated by the location current Is. A reference signal T having the same frequency and phase as that of the location current Is is generated by the reference signal transmitter 1b.

The detection current in the detection coil 3 and the reference signal T transmitted from the antenna 2a serve as input into the analog signal processor of the receiver 2, as described below, where the necessary signal processing thereof is conducted, and then the analog signals are converted into a digital signal. The digital signal serves as a continuous input into a calculation processing unit D, where the buried depth and horizontal direction position of the power cable 4 are calculated and the results thereof are indicated on a display unit E.

Figure 2:
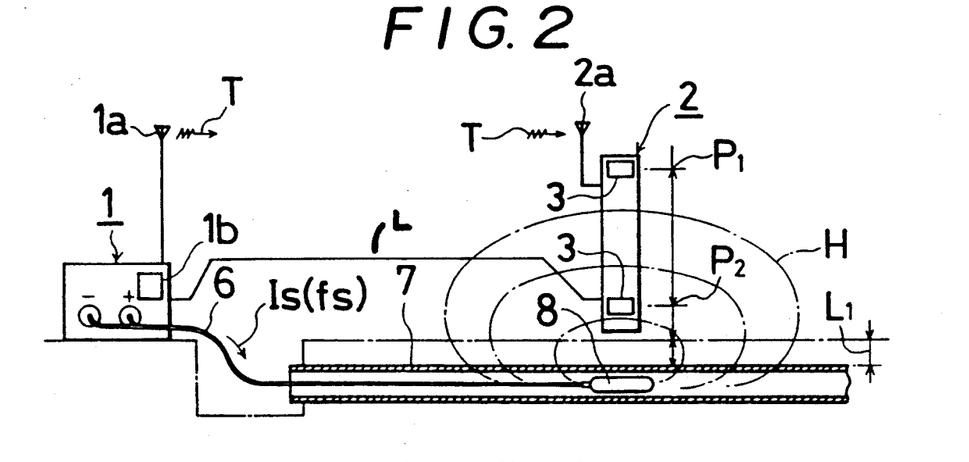
FIG. 2 is a general explanatory drawing for location of a nonconductive pipe by the use of a buried object locating device of the present invention.

FIG. 2 is a general explanatory drawing for location of the pipe 7 by the use of an embedded object locating device of the present invention. In signal transmitter 1b, a transmission antenna 1a for transmission of the reference signal, a receiver 2, a receiving antenna 2a for receiving the reference signal, a detection coil 3, a lead wire 6, a nonconductive pipe 7 and an oscillation coil 8.

For location of the pipe 7, the oscillation coil is initially inserted into the pipe 7, and is provided with a location current Is of the frequency fs, thereby creating a magnetic field H. A reference signal T from the reference signal transmitter 1b is transmitted through the transmission antenna 1a. As before, the reference signal has the same frequency and phase as that of the location current.

In the receiver 2, a detection current is generated in the detection coil 3 and a reference signal T is received by the receiving antenna 2a. The detection current and the reference signal T are provided to the analog signal processing unit D of the receiver 2 as aforementioned, and the buried depth of the pipe 7 is calculated in the calculation processing unit D by using the data transmitted from the analog signal processing unit C.

Transmitter 1 comprises any one of a plurality of well known oscillators and supplies a location current Is having a frequency fs of around 10 Hz-500 KHz to the conductor 4a of the power cable 4 the oscillation coil 8.

The transmitter 1 is also equipped with a known reference signal transmitter 1b for transmitting, from the antenna 1a, a reference signal T having the same frequency and phase as that of the location current Is.

The location current Is and the frequency fs of the reference signal T can be optionally adjusted, and an optimum frequency can be properly selected according to the type of the power cable or pipe 7 to be located and the underground conditions. The reference signal transmitter 1b can be realized by using a commonly available audio communication transceiver.

Additionally, if the reference signal T is on an audio frequency band, it can be directly transmitted. If the frequency fs of the location current Is is low, it is permissible to code the reference signal T, place it on a carrier in the audio frequency band and transmit it.

Figure 3:
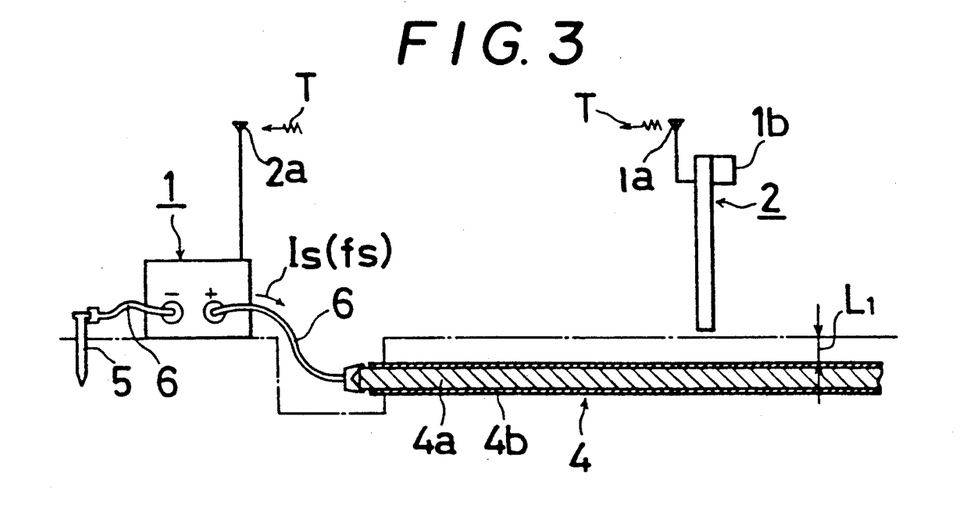
FIG. 3 is a general explanatory drawing showing a reference signal transmitter mounted on a receiver.
Figure 4:
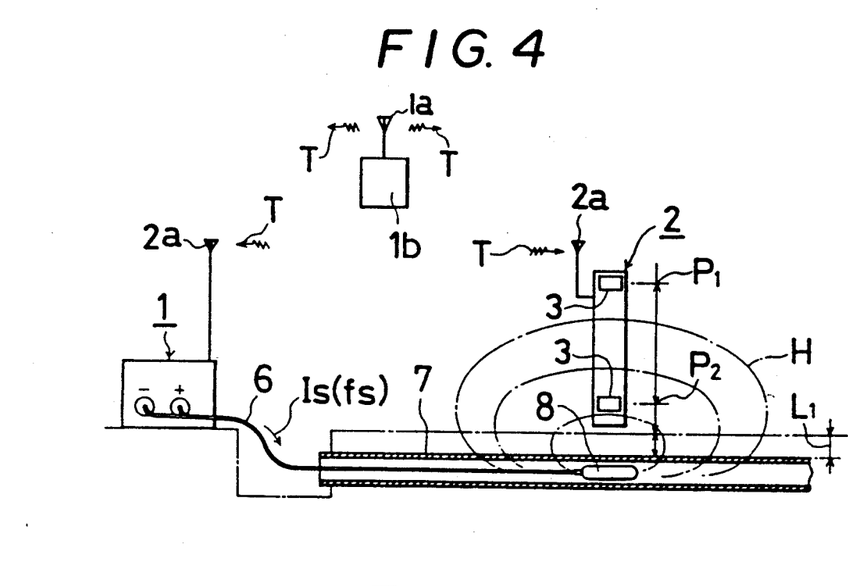
FIG. 4 is a general explanatory drawing showing a separate reference signal transmitter.

In the embodiments of FIGS. 1 and 2, the reference signal transmitter 1b is mounted in the oscillator 1. However, it is possible to mount the reference signal transmitter 1b on the receiver 2, as shown in FIG. 3, and it is also possible to mount the reference signal transmitter 1b separately from the oscillator 1 and receiver 2 as shown in FIG. 4.

In the embodiments of FIGS. 1 and 2, the reference signal T is shown as a wireless signal, but it is of course also possible to make the respective reference signal T a wire signal to be sent by using a line L.

Figure 5:
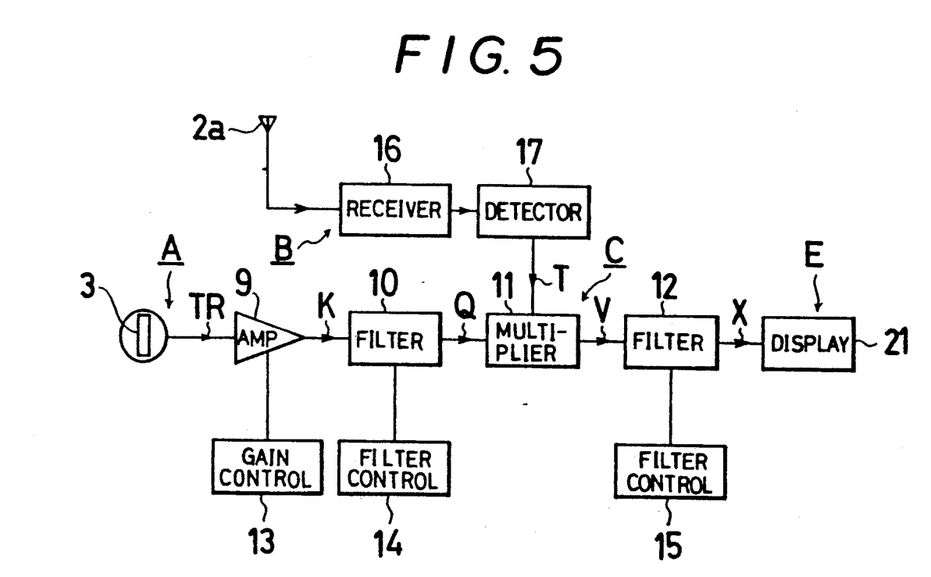
FIG. 5 is a block diagram showing the configuration of one embodiment of a device according to the invention.

FIG. 5 is a block diagram showing the configuration of the receiver 2 used in one preferred form of the invention. The receiver 2 comprises a detection unit A, a receiving unit B for receiving the reference signal T, an analog signal processing unit C and a display unit E.

Figure 7:
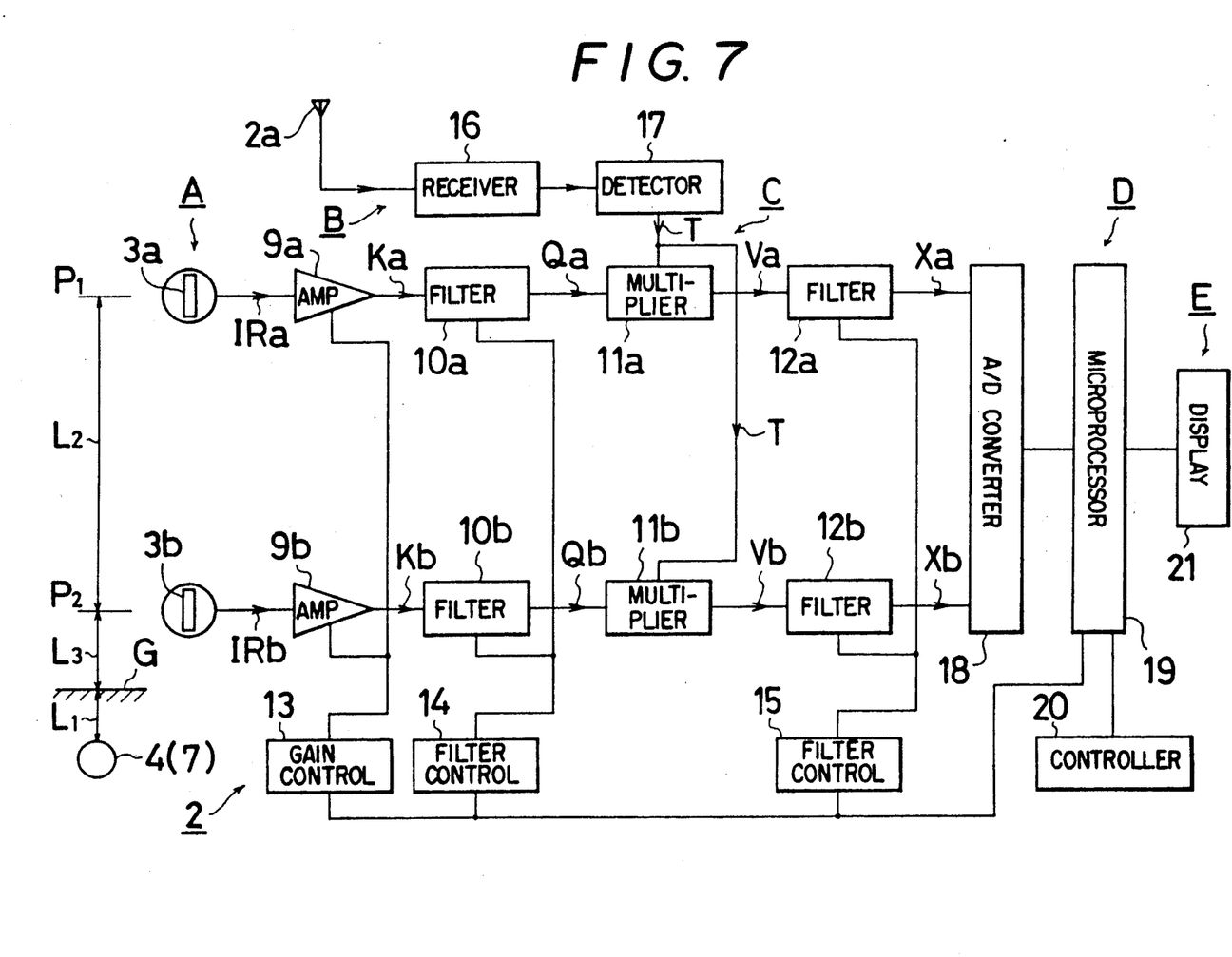
FIG. 7 is a block diagram showing the configuration of another embodiment of the invention in which only one coil is mounted in respective upper and lower positions.

The detection unit A is formed out of one piece of coil 3 mounted vertically, and is retained in a position approximately 100-300 mm above the ground G (shown in FIG. 7).

The reference signal receiving unit B is comprised of a known antenna 2a, receiver 16 and a detector 17, and this unit receives a reference signal T transmitted from the transmitter 1 and inputs it into the multiplier 11 of the analog signal processing unit C.

The analog signal processing unit C is formed by a preamplifier, first filter 10, multiplier 11, second filter 12, gain controller 13, first filter controller 14, and a second filter controller 15. The display unit E is formed out of a DC type meter 21.

Figure 6:
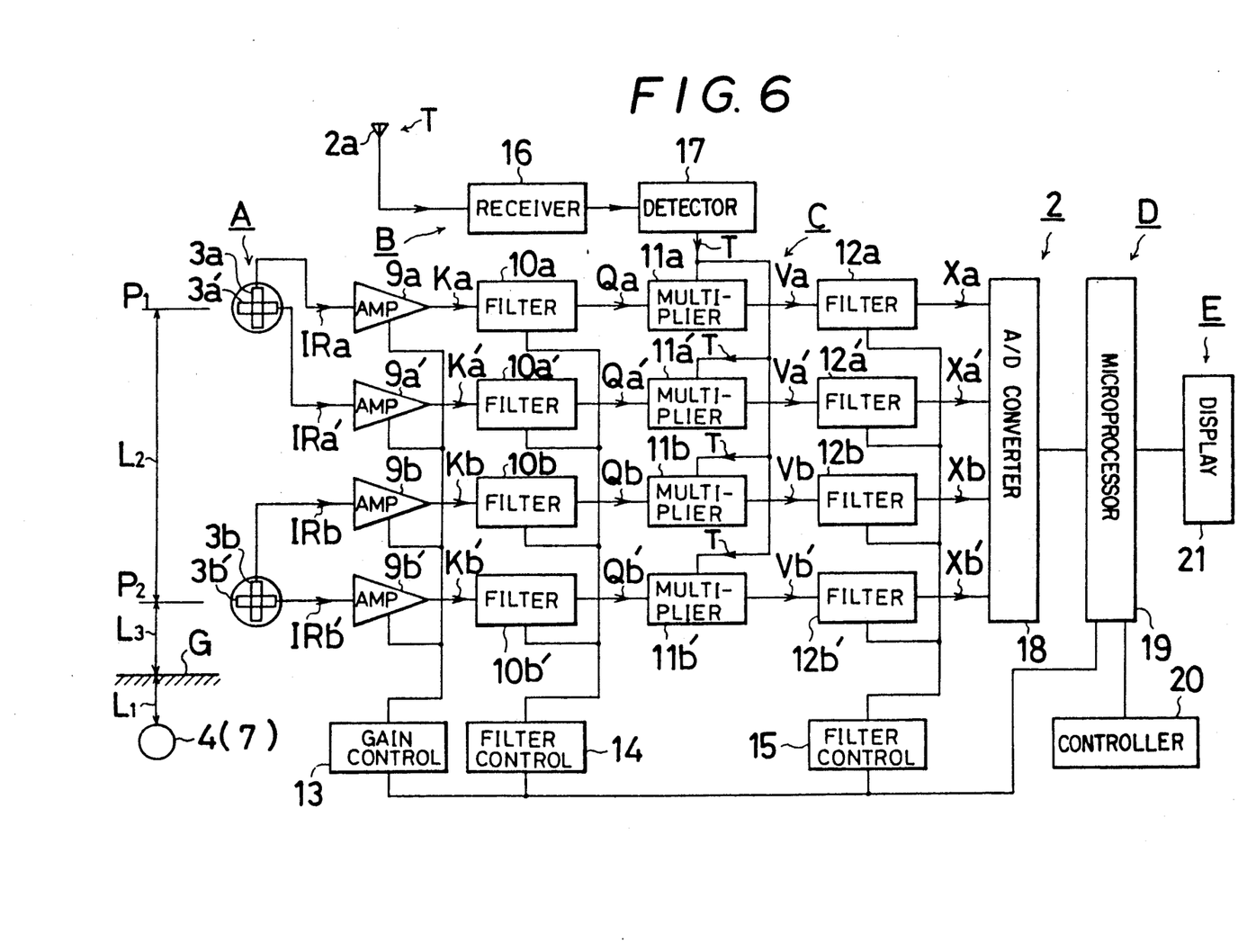
FIG. 6 is a block diagram showing the configuration of another embodiment of a receiver according to the invention.

FIG. 6 shows a block diagram indicating the configuration of the receiver 2 used in one preferred embodiment of the invention. The receiver 2 comprises a detection unit A, receiving unit B for receiving the reference signal T, an analog signal processing unit C, a calculation processing unit D and a display unit E.

The detection unit A is formed by two pieces of identical coils 3a-3b, mounted vertically, and two pieces of identical coils 3a'-3b mounted horizontally. The detection coil 3a and detection coil 3a' have been combined into one pair 3a-3b mounted vertically and two pieces of identical coils 3a'-3b mounted horizontally. The detection coil 3a and detection coil 3a' have been combined into one pair and are positioned in the position P₁, approximately 500-700 mm above the ground G. The detection coil 3b and detection coil 3b' have been combined into one pair and are positioned in the position P₂, approximately 100-200 mm above the ground G.

The reference signal receiving unit B is formed by a known antenna 2a, a receiver 16, a detector 17 and receives a reference signal T transmitted from the transmitter 1. The received reference signal serves as one of the inputs into the multiplier 11 of the analog signal processing unit C.

The analog signal processing unit C is formed by preamplifiers 9a-9b', first filters 10a-10b', multiplier 11a-11b', second filters 12a-12b', gain controller 13, first filter controller 14 and second filter controller 15. Each of the detection coils 3a'3b' and each analog signal processing circuit added thereto form one signal channel of a multichannel signal processor wherein the individual analog signal processing, as described below is conducted.

The calculation processing unit D is formed by an A-D converter 18, and a microprocessor 19, and receives an output signal transmitted from the analog signal processing unit C and performs various types of calculations to be subsequently described.

In operation, the detection currents IRa, IRa′–IRb, IRb′ generated in each of the detection coils $3a$–$3a′$–$3b$–$3b′$, are provided as individual inputs into the respective preamplifiers $9a$–$9a′$–$9b$–$9b′$, and then the signals are amplified according to the amplification rate adjusted by the gain controller 13. The detection currents IRa–IRb of the detection coils $3a$–$3b′$, contain a signal current IRs (having the same frequency, fs, as that of the location current Is transmitted from the transmitter, and having a frequency set in the frequency range of 10 Hz–500 KHz) and a noise current IRn generated by other noise sources.

The output signals K$a$–K$b′$ transmitted from the preamplifiers $9a$–$9b′$ are provided as inputs into the first filters $10a$–$10a′$–$10b$–$10b′$ which are well known low-pass filters, in which frequency components lower than the cutoff frequency are adjusted appropriately by the first filter controller 14 is removed from the output signals K$a$–K$b′$.

The cut-off frequency is set at the value near the frequency fs of the location current Is.

The output signals Q$a$–Q$b′$ transmitted from the first filters $10a$–$10b′$ are continuously provided as input into the respective multipliers $11a$–$11a′$–$11b$–$11b′$. The reference signal T is also provided to the multipliers $11a$–$11b′$ from the reference signal receiving unit B.

The reference signal T has been transmitted from the antenna $1a$ of transmitter 1 and has the same phase and frequency as that of the location current Is of the transmitter 1.

In the multipliers $11a$–$11b$–, the signals Q$a$–Q$b′$, transmitted from the first filters $10a$–$10b′$ and the reference signal T transmitted form the antenna $2a$, are multiplied.

Multiplication of the input signals Q$a$–Q$b′$ and the reference signal T causes the component of the input signals Q$a$–Q$b′$ having a frequency fs (and of the same phase as that of the reference signal T) to be converted into a DC component. The component of the input signals Q$a$–Q$b′$, having a frequency fs but differing in phase from the reference signal T is cut off. That is, in the concerned multipliers $11a$–$11b′$, the noise component contained in the input signals Q$a$–Q$b′$ having the frequency fs is removed.

The outputs V$a$–V$a′$–V$b$–V$b′$ fed from the multipliers $11a$–$11b′$ are provided as input into the second filters $12$–$12a′$–$12b$–$12b′$ that operate as known band-pass filters, and here the AC noise components contained in the signals VA–V$b′$ are cut off. The cutoff frequency of the second filters $12a$–$12b′$ is appropriately adjusted by the second filter controller 15.

The output signals X$a$–X$b′$ transmitted from the second filters $12a$–$12b′$ in which the noise component having the same frequency as the frequency fs and differing in phase has been removed by the multiplier 11, and in which the noise component having a frequency different from the frequency fs has been removed by the first filter 10 and second filter 12, are equivalent to a detection current induced in coils $3a$–$3b′$ by a magnetic field H generated by the detection current Is.

Each of the preamplifiers $9a$–$9b′$, first filters $10a$–$10b′$ and second filters $12a$–$12b′$ can be adjusted by a mutual interrelation of the gain and cut-off frequency, and they are controlled via the gain controller 13 and both filter controllers 14–15 by using the microprocessor 19.

As the multipliers $11a$–$11b$ and second filters $12a$–$12b′$ operate as band-pass filters automatically matching to the frequency fs of the reference signal T, it is unnecessary to adjust the frequency beforehand.

The output signals X$a$–X$b′$ transmitter from the second filters $12a$–$12b′$ are converted into digital signals by using the A-D converter 18, and thereafter they are provided as input into the microprocessor 19. In the microprocessor 19, on the bases of the control by the controller 20, various types of calculation including those as described in section 1 and 2 below are performed and the results thereof are indicated on the display 21.

1. Subtraction of the signals X$a$ and X$b$ and that of the signals X$a′$ and X$b′$—By these subtractions, a difference between the sizes of the magnetic fields on the upper position $P_1$ and lower position $P_2$ is obtained. The common noise components contained in each of the signals X$a$, X$b$ and X$b′$ (for example, the noise component having the same frequency and phase as those of the reference signal T, AC noise component that has passed the second filters $12a$–$12b′$, or the like) are subtracted and completely removed.

2. Calculation of the depth of a buried object—The depth $L_1$ is calculated on the basis of the difference between the strength of the magnetic field H detected in the upper position $P_1$ and lower position $P_2$ and the distances $L_2$, $L_3$.

3. Calculation of the horizontal direction position of the buried object—The horizontal direction position of the buried object is calculated on the basis of the difference between the strengths of said magnetic fields H, and the direction vector of the magnetic field H during movement of the position of the receiver 2.

In the embodiment of the receiver 2 in FIG. 6, the number of the detection coils 3 of the detection unit A is four and it is possible to increase the number of the detection coils 3 and improve the location accuracy more. For example, it is permissible to combine three detection coils toward the X, Y and Z axes and mount them on the upper/lower two stages (6 pcs of detection coil are required in total), or it is also possible to combine two detection coils toward the Z and Y axes and mount them on the upper/lower four stages (8 pcs of detection coil are required in total).

In the embodiment of the receiver in FIG. 6, first filters $10a$–$10b′$ are utilized. However, these first filters $10a$–$10b′$ can be omitted in the case where the reference signals T serving as input into the multipliers $11a$–$11b$ are sine waves.

Additionally, in the embodiment of the receiver in FIG. 6, the location current Is and frequency fs of the reference signal T are manually adjusted, but it is also possible to set the frequency fs automatically at an optimum setting according to the type of buried object (i.e. power cable 4 or pipe 7) and the depth of location.

Moreover, in the embodiment of the receiver in FIG. 6, only the results of the calculation processing unit D are indicated on the display 21 of the receiver 2, but it is also possible to indicate the size of the location current Is on the transmitter 1 side, frequency fs, power voltage or the like, via another wireless channel, on the display 21.

In the embodiment of FIG. 6, a pair of detection coils $3a$ and $3a′$ are mounted on the upper position $P_1$ and a pair of detection coils 3b and 3b' are mounted on the lower position P₂. However, it is also permissible to, as shown in FIG. 5, make the number of detection coils 3 of the detection unit A in one piece and simplify the structure of the receiver 2. In the case of FIG. 5, the DC output X is directly inputted into the meter type display 21, and the approximate position of buried object can be determined on the basis of the size of the needle movement of the display 21. That is, while moving the receiver 2, locating the point where needle movement in display 21 becomes a maximum leads to a finding that the buried object exists beneath that point.

It is also possible to, as shown in FIG. 7, individually mount one piece of detection coil 3a on the upper position P₁ and one piece of detection coil 3b on the lower position P₂. In this case, it is possible to calculate a depth of the buried object by using signals (Xa-Xb), but it is impossible to seek a horizontal direction of the buried object accurately.

Figure 8:
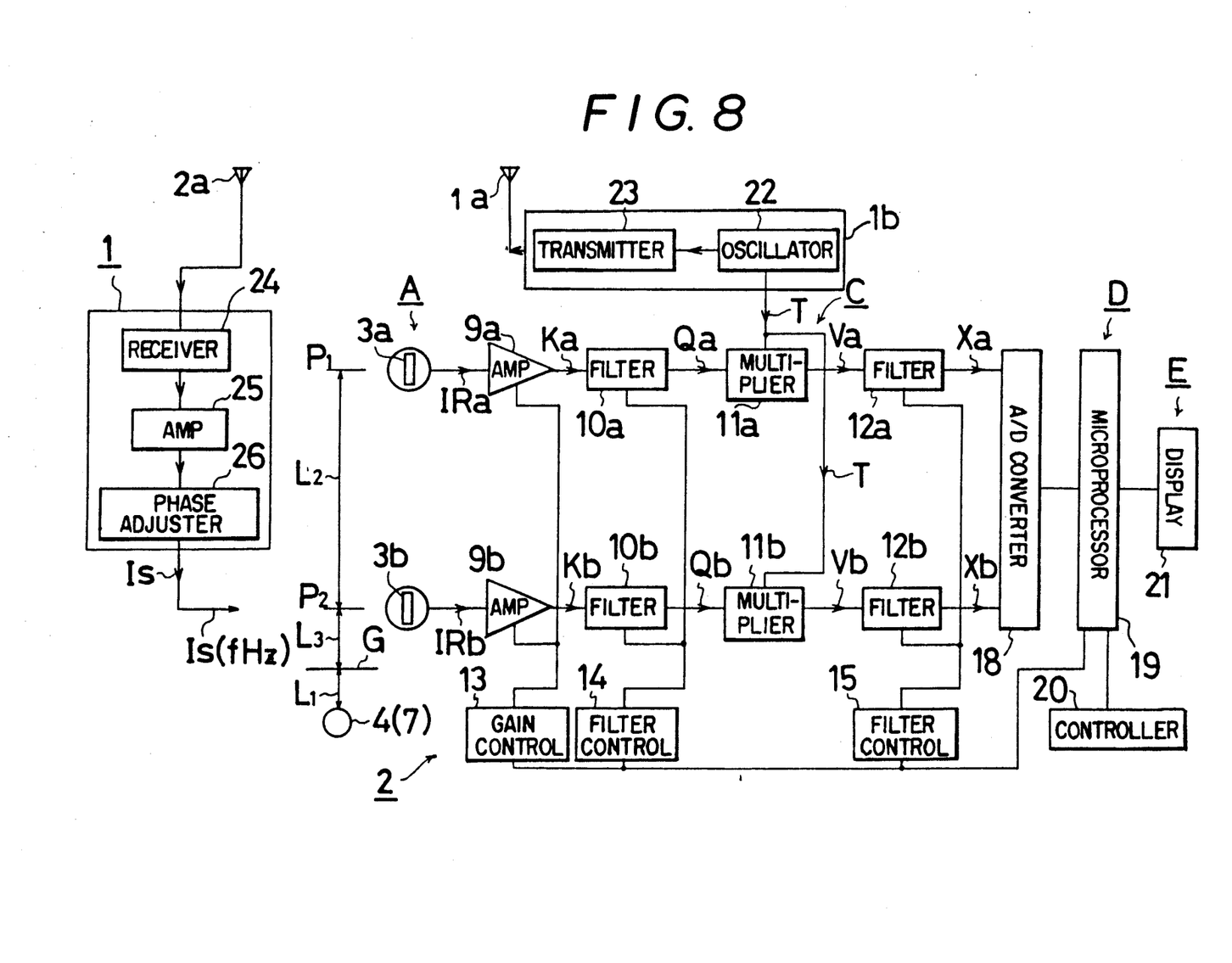
FIG. 8 is a block diagram of a receiver in which the reference signal transmitter is mounted on the receiver.

FIG. 8 shows a block diagram of the receiver 2 and oscillator 1 in the case where the reference signal transmitter 1b is mounted on the receiver 2 side. However, the detection unit A of the receiver 2 is formed by the detection coil 3a mounted on the upper position P₁ and detection coil 3b mounted on the lower position P₂.

FIG. 8 shows an oscillator 22 of the reference signal transmitter 1b, a transmission unit 23, a receiving unit 24 for receiving the reference signal T, mounted on the oscillator 1 side, and an oscillation amplifying unit 25 and a phase adjusting unit 26.

In summary, the present invention adopts a configuration in which a reference signal transmitter 1b transmits a reference signal T having the same frequency as that of the location current Is to be supplied to a buried object (or an oscillator 8 is built-in to the buried object) from a transmitter 1, and a multiplier 11 of the output signal Q from detectors and the reference signal T is mounted on the analog signal calculation unit C of the receiver.

The multiplication of the output signal Q and reference signal T allows the noise component having the same frequency as the frequency fs as the reference signal and differing in phase therefrom to be automatically cut-off. As the signal component having the same frequency fs of the reference signal T is converted into a DC component, it becomes very convenient for digitization of a signal.

In the invention as shown in FIG. 6, the receiving unit A comprises a detection coil mounted on the upper position P₁ and one mounted on the lower position P₂. The output signals of the individual detection coils are processed in parallel and then in the calculation processing unit D, a difference between the detection signals on the upper position P₁ and lower position P₂ is calculated.

This results in the almost complete removal of the noise components contained in the both upper and lower coils (for example, the DC noise component from the noise sourse, having the same frequency and phase as that of the reference signal T contained in the output signal of the multiplier, and the AC noise component that has passed through the filter 12) and the signal X input into the calculation processing unit D turns out to have less noise component.

Thus, as the present invention can remarkably reduce the noise content of the detection signal, even a deeply buried object can be accurately located and in the case of a embedded conductor, the conductor can be located over a long distance. Even if the location current Is is small, the invention can accurately locate a buried object without adverse consequences on other communication facilities.

What is claimed is:

1. Buried object locating apparatus comprising:
    a transmitter for supplying a location current having a selected frequency and phase for forming an alternating field around the buried object,
    a receiver for detecting the position of the buried object on the basis of the detected value of said alternating field,
    a reference signal transmitter for transmitting a reference signal having the same frequency and phase as that of said location current, and
    a means for receiving said reference signal,
    said receiver including:
    a detection unit equipped with a first detection coil located in a first, upper, position and a second detection coil located in a second, lower position,
    an analog signal processor unit equipped with a multiplier for the output signal transmitted from said detection unit and the reference signal transmitted from said reference siganl transmitter, and a filter for the output from the multipler,
    a calculation processing unit equipped with a n A/D converter for converting the output signal transmitted from the analog signal processing unit into a digital signal, and
    a microprocessor for calculating the position of the buried object by using the difference between the output signals of said detection coil located in said first, upper position and that of said detection coil located in said second, lower position, and
    a display unit for displaying the results of said calculation by said microprocessor.

2. Buried object locating apparatus as claimed in claim 1 wherein a first detection coil and a second detection coil are both mounted horizontally and spaced from each other in a vertical direction.

3. Buried object locating apparatus as claimed in claim 2 wherein a first detection coil and a second detection coil are both mounted vertically and spaced from each other in a vertical direction.

4. Buried object locating apparatus as claimed in claim 1 wherein a first detection coil comprises a detection coil mounted in a horizontal direction and a detection coil mounted in a vertical direction which are combined into one pair, and a second detection coil comprises a detection coil mounted in a horizontal direction and a detection coil mounted in a vertical direction which are combined into one pair.

5. Buried object locating apparatus as claimed in claim 1 wherein there are plural signal processing channels comprising a preamplifier, a first filter, a signal multiplier and a second filter arranged in parallel on the analog signal processing unit.

6. Buried object locating apparatus of claimed in claim 1 wherein a reference signal transmitter is mounted on a transmitter and a means for receiving reference signal is mounted on a receiver.

7. Buried object locating apparatus as claimed in claim 1 wherein either a wireless signal or wire fed signal is applied as a reference signal.

* * * * *